3,305,478
PROCESS FOR RE-REFINING USED
LUBRICATING OILS
James R. Gilson, Midland, and Charles R. Massicotte, Auburn, Mich., assignors to The Dow Chemical Company, Midland, Mich., a corporation of Delaware
No Drawing. Filed Aug. 13, 1964, Ser. No. 389,475
4 Claims. (Cl. 208—180)

The present invention is a novel process for renovating spent lubricating oils, and more particularly, it concerns a method for precipitating and removing from such oil the contamination resulting from its use in internal combustion engines.

In the past, used lubricating oils have been renovated, viz., reconditioned or re-refined, by treating them with concentrated sulfuric acid. This produces an acid sludge containing the undesired contamination. The supernatant oil is separated from the sludge and subsequently contacted with an activated, adsorbing clay to remove any remaining traces of acid, undesired color bodies and other contamination not precipitated with the acid sludge. A by-product of the above process is, of course, the acid sludge and this poses a serious waste disposal problem. Another problem connected with the above process follows from the use of the strong mineral acid which is corrosive to equipment and undesirably reactive with useful components of the used oil. The latter is most likely to be true if the oil contains aromatic hydrocarbons.

In view of the above, it is an object of the present invention to provide a novel treatment for the renovation of used lubricating oils. More particular objects are to avoid the production of difficultly disposable and corrosive acid sludges, and yet provide a rapid and efficient process for the removal of contamination in used oil. A still further object is to provide a used oil renovating treatment applicable to aromatic oils. The above, and other objects and benefits as will become manifest hereinafter, are accomplished in the present invention.

In the invention, a used lubricating oil is treated at a temperature within the range from about 50° F. up to 300° F., preferably within the range from about 120° F. up to 190° F., with an amount of diethylenetriamine, hereinafter referred to as DETA, sufficient to form a precipitate of contaminants in the oil. The actual amount of DETA used will vary, depending upon the amount of contamination and the desired degree of purification, but generally will fall within the range from as little as about 0.1% up to as much as about 12% based on the weight of the used oil. To achieve an optimum level of treatment for a particular oil, the DETA is added portionwise until no more precipitate is formed. Used lubricating oil means herein an oil containing contamination in the form of organic residues, e.g., oxidation products of oil components such as may be produced incidentally to the operation of internal combustion engines.

For best results, the treatment of the invention is effected by mixing the used oil and DETA, at a suitable temperature, with sufficient agitation to ensure complete and fairly rapid distribution of the treating reagent throughout the oil. Thereafter, the agitation, if any, is diminished to a low level to promote flocculation of precipitated oil contaminants. After addition of the treating agent, a preferred technique to effect separation of the precipitated and flocculated contamination is to cool the treated oil, as required, to a temperature of convenience below about 120° F., and settling the flocs to produce a clarified oil layer. If desired, however, separation of the flocs can be achieved more rapidly by any one or more other separatory techniques, which may be, if desired, carried out at higher temperatures, such as by centrifugation or filtration.

While the aforedescribed treatment of the invention produces a renovated oil having substantially improved properties as a lubricant, the usual practice, as is also true with sulfuric acid treatment, is to contact the used oil after flocculation of its contamination, with an activated, adsorbing clay. This secondary treatment removes additional impurities, e.g., color bodies, from the oil.

In the acid using process of the prior art, the clay contacting step is carried out after completion of the acid treatment and sludge separation steps. This is essential since the clay is relied upon to remove residual acid as well as color bodies. When the clay is used in accordance with the present invention, however, the clay can be contacted with the oil while the DETA generated flocs are still present in the system. Such a sequential dual treatment with DETA and then clay, avoids the need for an intervening sludge or floc separatory step. Subsequently, purified oil is obtained by settling or filtering the DETA generated flocs and clay out of the oil.

The amount of adsorptive clay used is not critical so long as color removal is satisfactory. Usually the amount of clay used varies from about 0.5% preferably at least about 5%, up to as much as 30% by weight of the oil. Temperature of the oil during the clay contacting phase of the operation may vary from as low as 50° F. up to as much as 400° F. Preferably the temperature is at least 200° F. As will be apparent to those skilled in the art, the heating of the oil should be carried out below its flash point.

Used lubricating oils renovated in the manner provided herein are stable against sludge and color development in normal storage, have a low neutralization number and a low ash content. Indirect advantages of significance stem from the facts that the DETA does not destroy useful components of the oil by sulfation or sulfonation, and further, the by-product sludges can be readily burned or used in land fills and thus they do not constitute a significant waste disposal problem.

To illustrate the usefulness of the invention a used lubricating oil was re-refined using DETA as described above. The specifications on the used oil, along with like measurements on a portion of the oil treated under the invention and still another portion given the acid sludge treatment of the prior art, are set forth with the ASTM designation of the procedure for making the indicated measurements.

Specifically, the treatment under the invention was carried out by heating a used lubricating oil to 180° F. While at this temperature it was treated with one percent by weight, based on the weight of the oil, of DETA with agitation to promote rapid dispersion of the additive throughout the warm oil. Thereafter the treated oil was stirred gently to promote flocculation and settling of the contamination for one hour. The oil was then cooled to about room temperature and allowed to stand without agitation to promote final settling of the flocs. The oil was then decanted from the resulting sludge and contacted with about 10% by weight, based on the weight of the oil of clay. The oil-clay admixture was heated at 350° F. and agitated for 30 minutes. The admixture was then filtered through a fritted glass filter to recover a purified and decolorized oil. Measurements of several properties of this re-refined oil are set forth in the following table along with like measurements on each the used oil employed for the feed stock in the above operation and a sample of a new oil comparable to the precursor of the used oil.

TABLE

| Property Measurement | Test Procedure ASTM-D- | Used Oil | Used Oil Re-Refined | New Oil |
|---|---|---|---|---|
| Specific Gravity | 1,298-55 | 0.8915 | 0.873 | 0.884 |
| API Gravity | 287-55 | 27.2 | 30.5 | 28.5 |
| Viscosity-SUS, 100° F | 88-56 | 329.1 | 308.82 | 361.4 |
| Viscosity-SUS, 210° F | 88-56 | 55.4 | 53.45 | 56.6 |
| Viscosity Index | 567-53 | 104 | 102 | 102 |
| Acid Number | 974-58T | 2.805 | 0.056 | |
| Flash point, ° F | 92-57 | 430 | 436 | 455 |
| Ash, Wt. percent | 482-59T | | 0.024 | 1.0 |

In further operations to demonstrate the uniqueness of DETA for the purposes of the invention, a series of treatments with other somewhat structurally and chemically related compounds were employed in a manner similar to that of the above operation, except that the concentration of the additive used was about 5% by weight of the oil. Among a large number of related compounds tested, and found to be unsatisfactory for the purpose of the invention, were ethylenediamine, triethylenetetraamine, tetraethylenepentamine, monoethanolamine, diethanolamine, triethanolamine, monoisopropylamine, and decyclohexylamine.

What is claimed is:

1. A process for renovating a used lubricating oil which comprises treating the oil at a temperature within the range from about 50° F. up to 400° F., with diethylenetriamine in an amount from about 0.1 percent up to about 12 percent, based on the weight of the oil, sufficient to flocculate contamination in the used oil and separating the flocculated contamination from the oil.

2. A process of claim 1 and including the additional step of contacting the oil with an activated, adsorbing clay to remove color bodies.

3. A process for renovating a used lubricating oil which comprises treating the oil at a temperature within a range within about 120° F. up to 190° F., with diethylenetriamine in amount from about 0.1 percent up to about 12 percent, based on the weight of the oil, sufficient to flocculate contamination in the used oil, cooling the treated oil as required to below about 120° F. and settling the resulting flocs to produce a clarified oil layer.

4. A process as in claim 3 which includes the additional step following the addition of diethylenetriamine to the oil, of contacting the oil with from about 0.5% up to as much as 30% by weight, based on the weight of the oil, of an activated adsorbing clay.

References Cited by the Examiner

UNITED STATES PATENTS 2,238,201  4/1941  Wilson et al. _____ 208—236
2,822,320  2/1958  Mitacek _____ 208—182

DELBERT E. GANTZ, *Primary Examiner.*

H. LEVINE, *Assistant Examiner.*